United States Patent
Yang et al.

(10) Patent No.: US 10,530,531 B2
(45) Date of Patent: Jan. 7, 2020

(54) ACKNOWLEDGEMENT INFORMATION FEEDBACK APPARATUS, METHOD AND COMMUNICATION SYSTEM

(71) Applicant: FUJITSU LIMITED, Kawasaki-shi, Kanagawa (JP)

(72) Inventors: Xianjun Yang, Beijing (CN); Xin Wang, Beijing (CN); Jian Zhang, Beijing (CN)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 16/107,230

(22) Filed: Aug. 21, 2018

(65) Prior Publication Data
US 2018/0359056 A1    Dec. 13, 2018

Related U.S. Application Data

(63) Continuation of application No. PCT/CN2016/076348, filed on Mar. 15, 2016.

(51) Int. Cl.
*H04L 1/16* (2006.01)
*H04W 72/00* (2009.01)
(Continued)

(52) U.S. Cl.
CPC ......... *H04L 1/1607* (2013.01); *H04W 72/005* (2013.01); *H04W 88/02* (2013.01); *H04W 88/08* (2013.01)

(58) Field of Classification Search
CPC ... H04L 1/1607; H04L 1/1671; H04L 1/1657; H04W 72/005; H04W 88/08; H04W 88/02
See application file for complete search history.

(56) References Cited

U.S. PATENT DOCUMENTS

| | | | |
|---|---|---|---|
| 2009/0196203 A1* | 8/2009 | Taira | H04B 7/0617 370/280 |
| 2016/0057604 A1* | 2/2016 | Luo | H04W 8/005 370/330 |
| 2016/0149629 A1* | 5/2016 | Zhang | H04L 1/0026 370/329 |

FOREIGN PATENT DOCUMENTS

| | | |
|---|---|---|
| CN | 101795170 A | 8/2010 |
| CN | 102412945 A | 4/2012 |

(Continued)

OTHER PUBLICATIONS

International Search Report issued by the State Intellectual Property Office of China for corresponding International Patent Application No. PCT/CN2016/076348, dated Dec. 1, 2016, with English translation.
(Continued)

Primary Examiner — Afshawn M Towfighi
(74) Attorney, Agent, or Firm — Myers Wolin, LLC.

(57) ABSTRACT

An acknowledgement information feedback apparatus, method and a communication system. The method includes: generating an acknowledgement response vector according to whether data transmitted by a plurality of UEs based on contention are correctly demodulated; generating a measurement vector according to a predetermined compressed sensing measurement matrix and the generated acknowledgement response vector; and broadcasting the measurement vector to the plurality of UEs. The UE recovers the acknowledgement response vector according to a compressed sensing measurement matrix and the measurement vector, and determines whether the transmitted data are correctly demodulated according to the recovered acknowledgement response vector. Hence, it is not only applicable to contention-based data transmission scenarios, but also has relatively low signaling overhead and reliable performance.

15 Claims, 10 Drawing Sheets

(51) Int. Cl.
*H04W 88/02* (2009.01)
*H04W 88/08* (2009.01)

(56) References Cited

FOREIGN PATENT DOCUMENTS

| | | | |
|---|---|---|---|
| CN | 102647246 | A | 8/2012 |
| CN | 102714816 | A | 10/2012 |
| CN | 105162548 | A | 12/2015 |
| CN | 105338509 | A | 2/2016 |
| WO | 2014/169695 | A1 | 10/2014 |
| WO | 2014/206167 | A1 | 12/2014 |

OTHER PUBLICATIONS

Written Opinion of the International Searching Authority issued by the State Intellectual Property Office of China for corresponding International Patent Application No. PCT/CN2016/076348, dated Dec. 1, 2016, with English translation.
Donoho, "Compressed sensing," IEEE Transactions on Information Theory, vol. 52, No. 4, pp. 1289-1306, Apr. 2006; (cited in Specification).
Needell et al., "CoSaMP: Iterative signal recovery from incomplete and inaccurate samples," Applied and Computational Harmonic Analysis, vol. 26, No. 3, pp. 301-321, Jul. 22, 2008; (cited in Specification).
Yang et al., "Anti-noise-folding regularized subspace pursuit recovery algorithm for noisy sparse signals," Wireless communications and Networking Conference (WCNC), 2014 IEEE, Istanbul, 2014, pp. 275-280; (cited in Specification).
Chandar et al., "A simple message-passing algorithm for compressed sensing," Information Theory Proceedings (ISIT), 2010 IEEE International Symposium, Austin, TX, Jun. 13-18, 2010, pp. 1968-1972; (cited in Specification).
Wu et al., "A Cooperative ARQ Protocol Based on Conditional Probability Retransmission", Journal of Nanjing University of Posts and Telecommunications(Natural Science), vol. 32, No. 2, Apr. 2012.

* cited by examiner

ACKNOWLEDGEMENT INFORMATION FEEDBACK APPARATUS, METHOD AND COMMUNICATION SYSTEM

CROSS REFERENCE TO RELATED APPLICATIONS

This application is a continuation application of International Application PCT/CN2016/076348 filed on Mar. 15, 2016, the entire contents of which are incorporated herein by reference.

TECHNICAL FIELD

This disclosure relates to the field of communication technologies, and in particular to an acknowledgement (ACK) information feedback apparatus, method and a communication system.

BACKGROUND

In contention-based uplink data transmission, a user equipment (UE) transmits data without dedicated resources. Thus, it is possible that different UEs transmit data on the same resource, resulting in data collision. To make the data transmission reliable, a base station is required to acknowledge data successfully received from different UEs, that is, to send an acknowledgement (ACK) information to corresponding UE. Consequently, it is necessary to explicitly or implicitly indicate which ACK belongs to which UE when the base station transmits ACK information.

An intuitive implicit indication method is establishing a one-to-one mapping relationship table related to ACK information based on user equipment identifiers (UE-IDs) for all UEs registered in a base station. In each time of feedback, the base station broadcasts the above relationship table to all UEs, and the UE may obtain corresponding ACK information by receiving and demodulating the relationship table. A biggest defect of the above UE-ID-based ACK feedback (it may be called as UIAF) method is that when only a few UEs are in an active state, a great part of resources in the above relationship table do not carry valid data.

In IEEE 802.11, a relationship between ACK information and a UE is explicitly expressed; in particular, the ACK information is transmitted by a specific control frame containing corresponding UE-IDs. Generally speaking, a size of a UE-ID is $\lceil \log_2 N \rceil$ bits; however, for an ACK information of only one bit, overhead of such a method is still relatively high.

In the 3rd generation partnership project (3GPP) long term evolution (LTE), the above signaling overhead is avoided by the researchers via one-to-one mapping between the ACK information and pre-allocated transmitting resources of the UE. However, unfortunately, the above transmitting resource based ACK feedback (it may be called as REAF) method in the 3GPP LTE cannot be directly used in contention-based data transmission, as in the contention-based data transmission, the resources are not dedicated to the UE.

In summary, there is a currently urgent need for a feedback method for ACK information, which is relatively low in signaling overhead, reliable in performance, and applicable to contention-based data transmission scenarios.

It should be noted that the above description of the background is merely provided for clear and complete explanation of this disclosure and for easy understanding by those skilled in the art. And it should not be understood that the above technical solution is known to those skilled in the art as it is described in the background of this disclosure.

Documents advantageous to understanding of this disclosure and conventional technologies are listed below, which are incorporated herein by reference, as they are fully described in this text.

[1] D. L. Donoho, "Compressed sensing," IEEE Transactions on Information Theory, vol. 52, no. 4, pp. 1289-1306, 2006.

[2] D. Needell and J. A. Tropp, "Cosamp: Iterative signal recovery from incomplete and inaccurate samples," Applied and Computational Harmonic Analysis, vol. 26, no. 3, pp. 301-321, 2009.

[3] X. Yang, Q. Cui, E. Dutkiewicz, X. Huang, X. Tao and G. Fang, "Anti-noise-folding regularized subspace pursuit recovery algorithm for noisy sparse signals," Wireless Communications and Networking Conference (WCNC), 2014 IEEE, Istanbul, 2014, pp. 275-280.

[4] V. Chandar, D. Shah and G. W. Wornell, "A simple message-passing algorithm for compressed sensing," Information Theory Proceedings (ISIT), 2010 IEEE International Symposium on, Austin, Tex., 2010, pp. 1968-1972.

SUMMARY

Embodiments of this disclosure provide an acknowledgement information feedback apparatus, method and a communication system, which are not only applicable to (or suitable for) contention-based data transmission scenarios, but also have relatively low signaling overhead and are reliable in performance.

According to a first aspect of the embodiments of this disclosure, there is provided an acknowledgement information feedback method, including:

generating an acknowledgement response vector according to whether data transmitted by a plurality of UEs based on contention are correctly demodulated;

generating a measurement vector according to a predetermined compressed sensing measurement matrix and the generated acknowledgement response vector; and broadcasting the measurement vector to the plurality of UEs.

According to a second aspect of the embodiments of this disclosure, there is provided an acknowledgement information feedback apparatus, including:

an information generating unit configured to generate an acknowledgement response vector according to whether data transmitted by a plurality of UEs based on contention are correctly demodulated;

a vector generating unit configured to generate a measurement vector according to a predetermined compressed sensing measurement matrix and the generated acknowledgement response vector; and a vector broadcasting unit configured to broadcast the measurement vector to the plurality of UEs.

According to a third aspect of the embodiments of this disclosure, there is provided an acknowledgement information feedback method, including:

receiving a measurement vector used for feeding back acknowledgement information, after transmitting data based on contention;

recovering an acknowledgement response vector according to a predetermined compressed sensing measurement matrix and the measurement vector; and determining whether the transmitted data are correctly demodulated according to the recovered acknowledgement response vector.

According to a fourth aspect of the embodiments of this disclosure, there is provided an acknowledgement information feedback apparatus, including:

a vector receiving unit configured to receive a measurement vector used for feeding back acknowledgement information, after transmitting data based on contention;

an information recovering unit configured to recover an acknowledgement response vector according to a predetermined compressed sensing measurement matrix and the measurement vector; and a data determining unit configured to determine whether the transmitted data are correctly demodulated according to the recovered acknowledgement response vector.

According to a fifth aspect of the embodiments of this disclosure, there is provided a communication system, including:

a UE configured to transmit data to a base station based on contention, and receive a measurement vector used for feeding back acknowledgement information; recover an acknowledgement response vector according to a predetermined compressed sensing measurement matrix and the measurement vector; and determine whether the transmitted data are correctly demodulated according to the recovered acknowledgement response vector; and the base station configured to generate an acknowledgement response vector according to whether data transmitted by a plurality of UEs based on contention are correctly demodulated; generate a measurement vector according to a predetermined compressed sensing measurement matrix and the generated acknowledgement response vector; and broadcast the measurement vector to the plurality of UEs.

An advantage of the embodiments of this disclosure exists in that the measurement vector is generated according to the compressed sensing measurement matrix and the generated acknowledgement response vector and is broadcasted. Hence, this disclosure is not only applicable to contention-based data transmission scenarios, but also has relatively low signaling overhead and reliable performance.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprise/include" when used in this specification is taken to specify the presence of stated features, integers, steps or components but does not preclude the presence or addition of one or more other features, integers, steps, components or groups thereof.

BRIEF DESCRIPTION OF THE DRAWINGS

Elements and features depicted in one drawing or embodiment of the disclosure may be combined with elements and features depicted in one or more additional drawings or embodiments. Moreover, in the drawings, like reference numerals designate corresponding parts throughout the several views and may be used to designate like or similar parts in more than one embodiment.

DETAILED DESCRIPTION

These and further aspects and features of the present disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims.

In the embodiments of the present disclosure, a base station may be referred to as an access point, a broadcast transmitter, a node B, or an evolution node B (eNB), etc., and may include some or all functions of them. A term "base station" shall be used in the text, and each base station provides communication coverage for a specific geographical region. A term "cell" may refer to a base station and/or a coverage region thereof, depending on the context using the term.

In the embodiments of the present disclosure, a mobile station or equipment may be referred to as user equipment (UE). The UE may be fixed or mobile, and may also be referred to as a mobile station, a terminal, an access terminal, a user unit, or a station, etc. The UE may be a cellular phone, a personal digital assistant (PDA), a wireless modem, a wireless communication device, a handhold device, a lap-top computer, and a cordless telephone, etc.

Embodiment 1

Figure 1:
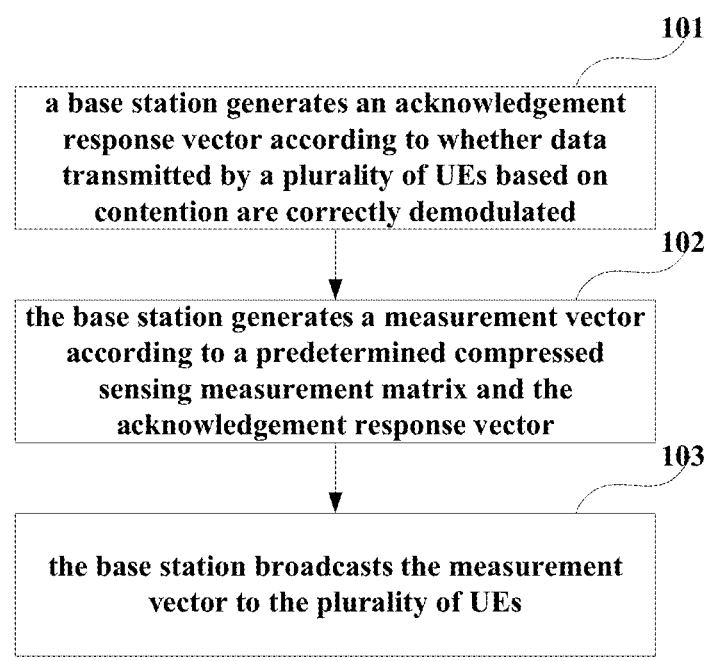
FIG. 1 is a schematic diagram of the acknowledgement information feedback method of Embodiment 1 of this disclosure.

The embodiment of the present disclosure provides an acknowledgement information feedback method, which shall be described from a transmitting device (such as a base station) of the acknowledgement information. FIG. 1 is a schematic diagram of the acknowledgement information feedback method of the embodiment of this disclosure. As shown in FIG. 1, the feedback method includes:

Block 101: a base station generates an acknowledgement response vector according to whether data transmitted by a plurality of UEs based on contention are correctly demodulated.

Block 102: the base station generates a measurement vector according to a predetermined compressed sensing measurement matrix and the generated acknowledgement response vector; and Block 103: the base station broadcasts the measurement vector to the plurality of UEs.

In an embodiment, the UE may be a machine type communication (MTC) terminal in an IoT (Internet of Things) system, and a plurality of UEs transmit uplink data based on contention to a base station (such as an eNB) of the IoT system. However, this disclosure is not limited thereto, for example may be used in other communication system and it is also applicable to any communication systems performing data transmission and acknowledgement information feedback.

In an embodiment, the base station may be a macro base station (such as an eNB), and a macro cell generated by the macro base station may serve for the UE; or the base station may also be a pico base station, and a pico cell or small cell generated by the pico base station may serve for the UE. However, this disclosure is not limited thereto, and a particular scenario may be determined according to an actual requirement.

In an embodiment, the UE transmits data based on contention, while data reception and acknowledgement information feedback may be performed by a base station. However, this disclosure is not limited thereto; for example, data reception and acknowledgement information feedback may be performed by another UE or by another device in a network side. The embodiment of this disclosure is described by only taking a scenario as an example where "the UE transmits uplink data based on contention to the base station, and the base station feeds back acknowledgement information according to data demodulation".

In an embodiment, it is assumed that the base station serves for N UEs; K UEs are in an activated state and transmit data, and N is greater than or equal to K. In block 101, the base station may generate the acknowledgement response vector of N×1 according to whether data transmitted by a plurality of UEs are correctly demodulated.

It is assumed that $x_n$ is an element in the acknowledgement response vector, n being greater than or equal to 1 and less than or equal to N; then $x_n$ being 1 may show that data transmitted by an n-th UE are correctly demodulated, and $x_n$ being 0 may show that data transmitted by the n-th UE are not correctly demodulated, or the n-th UE does not transmit data;

alternatively, $x_n$ being 0 may show that data transmitted by the n-th UE are correctly demodulated, and $x_n$ being 1 may show that data transmitted by the n-th UE are not correctly demodulated, or the n-th UE does not transmit data.

It should be noted that contents of the acknowledgement response vector are only schematically described above. However, this disclosure is not limited thereto, and a particular implementation of the acknowledgement response vector may be determined according to an actual situation.

In block 102, the base station may generate a measurement vector of M×1 according to the compressed sensing measurement matrix of M×$N_{ZC}$ and the acknowledgement response vector of N×1; where, M≥cK log(N/K), c is a constant, and $N_{ZC}$ is a prime number greater than or equal to N. According to the compressed sensing principle, the number M of rows that are randomly extracted needs to satisfy the above condition.

Hence, in comparison with the relevant art where the acknowledgement response vector of N×1 needs to be transmitted, the embodiment of this disclosure needs only to transmit the measurement vector of M×1, which is not only applicable to contention-based data transmission scenarios, but also has relatively low signaling overhead and reliable performance.

Figure 2:
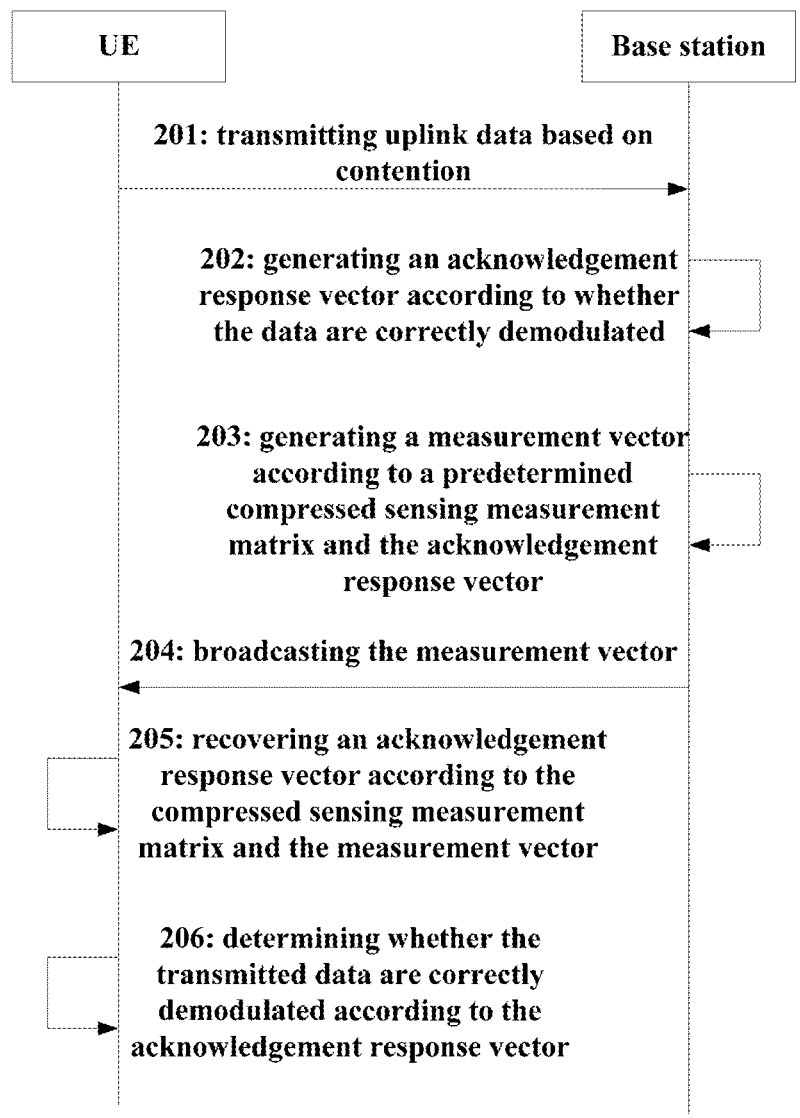
FIG. 2 is another schematic diagram of the acknowledgement information feedback method of Embodiment 1 of this disclosure.

FIG. 2 is another schematic diagram of the acknowledgement information feedback method of the embodiment of this disclosure, in which a feedback process of this disclosure is shown from a UE side and a base station side. As shown in FIG. 2, the feedback method includes:

201: a UE transmits uplink data based on contention to the base station.

202: the base station generates the acknowledgement response vector according to whether the data are correctly demodulated.

In an embodiment, the base station may generate the acknowledgement response vector x; where, x is, for example, a binary vector of N×1 with sparseness of K; for example, $x_n$=1 shows that the base station successfully demodulates data from an n-th UE, $x_n$=0 shows that the base station does not successfully demodulate the data from the n-th UE, or the n-th UE does not transmit data to the base station. However, this disclosure is not limited thereto, and a particular implementation of the acknowledgement response vector may be determined according to an actual situation.

203: the base station generates a measurement vector according to a predetermined compressed sensing measurement matrix and the generated acknowledgement response vector.

In an embodiment, the compressed sensing measurement matrix may be predetermined; for example, the compressed sensing measurement matrix may be generated according to a partial circulant orthogonal matrix, and details are as described in the following embodiments; however, this disclosure is not limited thereto; for example, the compressed sensing measurement matrix may also be determined according to Gaussian distribution, or Bernoulli distribution, etc.

In an embodiment, after generating the compressed sensing measurement matrix, the base station may further transmit the compressed sensing measurement matrix to the UE; and furthermore, the UE may generate the compressed sensing measurement matrix by itself; however, this disclosure is not limited thereto, so long as the base station side and the UE side pre-obtain the compressed sensing measurement matrix.

In an embodiment, the measurement vector Φx may be generated according to the compressed sensing measurement matrix Φ and the generated acknowledgement response vector x; where, zero may be added to the N×1 acknowledgement response vector, so as to generate an $N_{ZC}×1$ vector, and then, the $M×N_{ZC}$ compressed sensing measurement matrix may be multiplied by the $N_{ZC}×1$ vector, so as to generate the M×1 measurement vector.

204: the base station broadcasts the measurement vector to the plurality of UEs.

205: the UE recovers an acknowledgement response vector according to the compressed sensing measurement matrix and the measurement vector, after receiving the measurement vector.

In an embodiment, for a UE not transmitting data, the measurement vector may be neglected; and for a UE having transmitted data, the UE may receive a signal y=Φx+n transmitted by the base station; where, Φx is the above broadcasted measurement vector, and n is a Gaussian white noise with a mean value of 0 and variance of $σ^2$; then a compressed sensing recovery method, such as a compressive sampling matching pursuit (CoSaMP) algorithm, a regularized subspace pursuit (RSP) algorithm, or an approximate massage passing (AMP) algorithm, etc., may be used to estimate the transmitted acknowledgement response vector x from the received signal y according to the compressed sensing measurement matrix.

206: the UE determines whether the transmitted data are correctly demodulated according to the recovered acknowledgement response vector.

The feedback process of the acknowledgement information is schematically described above, and how to generate the compressed sensing measurement matrix shall be described below by taking the partial circulant orthogonal matrix as an example.

Figure 3:
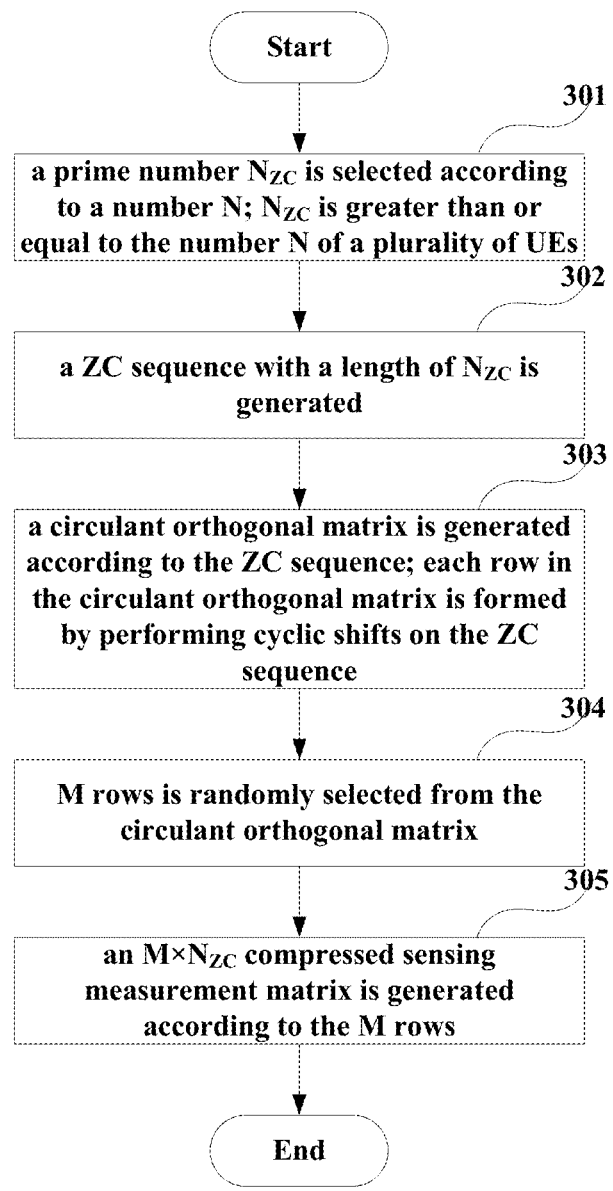
FIG. 3 is a schematic diagram of generating a compressed sensing measurement matrix of Embodiment 1 of this disclosure.

FIG. 3 is a schematic diagram of generating the compressed sensing measurement matrix of the embodiment of this disclosure. As shown in FIG. 3, a method for generating the compressed sensing measurement matrix may include:

Block 301: a prime number $N_{ZC}$ is selected according to a number N; $N_{ZC}$ is greater than or equal to the number N of a plurality of UEs.

For example, if the number N of the plurality of UEs registered in the base station is 500, a minimum prime number 503 greater than 500 may be selected, that is, $N_{ZC}=503$; however, this disclosure is not limited thereto; for example, other prime numbers greater than N may also be selected.

Block 302: a ZC sequence with a length of $N_{ZC}$ is generated;

reference may be made to related techniques for details of the ZC (Zadoff-Chu) sequence.

Block 303: a circulant orthogonal matrix is generated according to the ZC sequence; each row in the circulant orthogonal matrix is formed by performing cyclic shifts on the ZC sequence.

For example, cyclic shifts of 1-503 bits may be performed on the ZC sequence, and the above cyclic shifts are sequentially taken as rows of the matrix, thereby generating an $N_{ZC}×N_{ZC}$ circulant orthogonal matrix Z.

Block 304: M rows is randomly selected from the circulant orthogonal matrix.

For example, M rows are selected from the above circulant orthogonal matrix Z; where, $$M \geq cK\log\left(\frac{N}{K}\right);$$

for example, a value of M is taken as 124, a partial circulant orthogonal matrix $Φ=R_ΩZ$ is obtained; where, $R_Ω$ is a randomly selected matrix of 124×503, and Ω designates a subscript of a randomly selected row; however, this disclosure is not limited thereto; for example, M rows may also be selected according to a predetermined rule.

Block 305: an $M×N_{ZC}$ compressed sensing measurement matrix is generated according to the M rows.

In an embodiment, the compressed sensing measurement matrix is generated by the above partial circulant orthogonal matrix, while a small storage space is needed, performance is good and complexity is low. However, this disclosure is not limited thereto, and other means may also be used to generate the compressed sensing measurement matrix.

It should be noted that FIGS. 2 and 3 only schematically explains the embodiment of this disclosure; however, this disclosure is not limited thereto. For example, an order of execution of the blocks or steps may be appropriately adjusted, and furthermore, some other blocks or steps may be added, or some of these blocks or steps may be reduced. And appropriate modifications may be made by those skilled in the art according to what is described above, without being limited to those contained in the above figures.

It can be seen from the above embodiment that the measurement vector is generated according to the compressed sensing measurement matrix and the generated acknowledgement response vector and is broadcasted. Hence, this disclosure is not only applicable to contention-based data transmission scenarios, but also has relatively low signaling overhead and reliable performance.

Embodiment 2

The embodiment of the present disclosure provides an acknowledgement information feedback method, which shall be described from a receiving device (such as a UE) of the acknowledgement information, with contents identical to those in Embodiment 1 being not going to be described herein any further.

Figure 4:
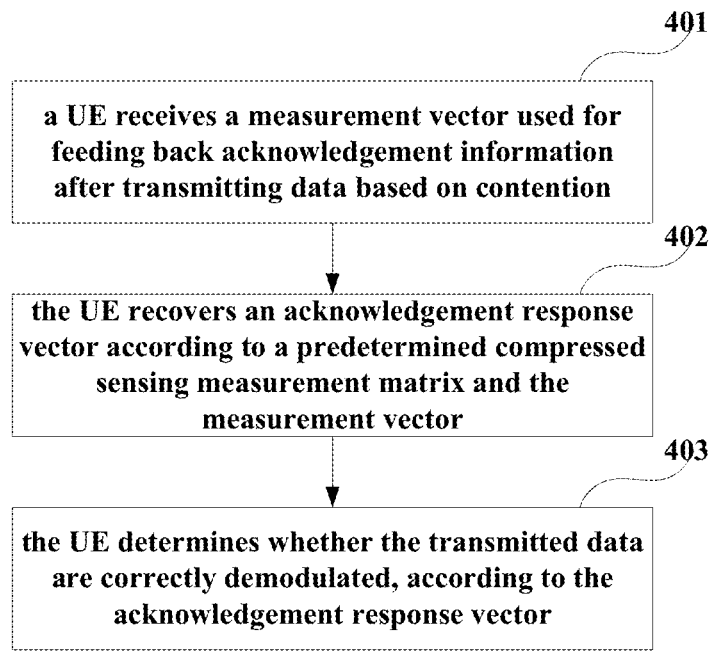
FIG. 4 is a schematic diagram of the acknowledgement information feedback method of Embodiment 2 of this disclosure.

FIG. 4 is a schematic diagram of the acknowledgement information feedback method of the embodiment of this disclosure. As shown in FIG. 4, the feedback method includes:

Block 401: a UE receives a measurement vector used for feeding back acknowledgement information after transmitting data based on contention.

Block 402: the UE recovers an acknowledgement response vector according to a predetermined compressed sensing measurement matrix and the measurement vector; and Block 403: the UE determines whether the transmitted data are correctly demodulated, according to the recovered acknowledgement response vector.

In an embodiment, the acknowledgement response vector may be an N×1 vector, N being the number of a plurality of UEs, K being the number of UEs being in an activated state and transmitting data in the plurality of UEs, and N being greater than or equal to K.

$x_n$ is an element in the acknowledgement response vector, n being greater than or equal to 1 and less than or equal to N; $x_n$ being 1 showing that data transmitted by an n-th UE are correctly demodulated, and $x_n$ being 0 showing that data transmitted by the n-th UE are not correctly demodulated, or the n-th UE does not transmit data;

alternatively $x_n$ being 0 showing that data transmitted by the n-th UE are correctly demodulated, and $x_n$ being 1 showing that data transmitted by the n-th UE are not correctly demodulated, or the n-th UE does not transmit data.

It should be noted that contents of the acknowledgement response vector are only schematically described above. However, this disclosure is not limited thereto, and a particular implementation of the acknowledgement response vector may be determined according to an actual situation.

In an embodiment, the compressed sensing measurement matrix may be an $M \times N_{ZC}$ matrix, and the measurement vector may be an $M \times 1$ vector; where, $M \geq cK \log(N/K)$, c is a constant, and $N_{ZC}$ is a prime number greater than or equal to N.

In an embodiment, the UE may generate the compressed sensing measurement matrix according to a partial circulant orthogonal matrix; or the UE may receive the compressed sensing measurement matrix transmitted by the base station, thereby obtaining the compressed sensing measurement matrix. However, this disclosure is not limited thereto; for example, the compressed sensing measurement matrix may also be preset ex-works.

In this embodiment, the UE may receive a signal, for example, $y=\Phi x+n$ transmitted by the base station; where, $\Phi x$ is the above measurement vector, and n is a Gaussian white noise with a mean value of 0 and variance of $\sigma^2$; then a compressed sensing recovery method, such as a CoSaMP algorithm, an RSP algorithm, or an AMP algorithm, etc. may be used to estimate the transmitted acknowledgement response vector x from the received signal y according to the compressed sensing measurement matrix.

It can be seen from the above embodiment that the measurement vector is generated according to the compressed sensing measurement matrix and the generated acknowledgement response vector and is broadcasted. Hence, this disclosure is not only applicable to contention-based data transmission scenarios, but also has relatively low signaling overhead and reliable performance.

Embodiment 3

The embodiment of the present disclosure shall be further described on the basis of embodiments 1 and 2 by way of examples.

In this embodiment, it is assumed that the number of UEs registered in the base station is N=500, and a probability that each UE is in an active state is Pa=0.05, then an average value of active UEs is K=25, and the number of resources used for contention is $N_r=64$.

In an embodiment, each active UE may randomly select one resource from preset $N_r=64$ resources, so as to transmit data to a base station in a contention-based manner. The base station may generate a 500×1 binary sparse vector x according to successfully demodulated data and their corresponding user equipment identifiers (UE-IDs); $x_n=1$ shows that the base station successfully demodulates data from an n-th UE, and $x_n=0$ shows that the base station does not successfully demodulate the data from the n-th UE or the n-th UE is in an inactive state.

In an embodiment, the base station may select a prime number $N_{ZC}=503$ greater than the number N=500 of UEs, and take it as a length of the ZC sequence for generating the compressed sensing measurement matrix. And the base station may generate the ZC sequence with a length of 503, perform cyclic shifts of 1-503 bits on the ZC sequence, and sequentially take the above cyclic shifts as rows of a matrix, thereby generating an $N_{ZC} \times N_{ZC}$ circulant orthogonal matrix Z.

Then, for example, M rows are randomly selected from the above circulant orthogonal matrix Z; where, $$M \geq cK \log\left(\frac{N}{K}\right),$$

for example, a value of M is taken as 124. Hence, a partial circulant orthogonal matrix $\Phi=R_\Omega Z$ is obtained; where, $R_\Omega$ is a randomly selected matrix of 124×503, and $\Omega$ designates a subscript of a randomly selected row.

In an embodiment, as the measurement matrix $\Phi$ is 124×503 and the ACK response vector x is 500×1, in order to obtain the measurement vector, zero may be added to a trailing end of the original ACK response vector x, which is changed into a 503×1 ACK response vector x'.

Hence, a measurement vector finally generated by the base station is $\Phi x'$, which may be broadcasted to all the UEs.

In an embodiment, the active UE may receive a signal $y=\Phi x+n$ transmitted by the base station; where, n is a Gaussian white noise with a mean value of 0 and variance of $\sigma^2$. Then the UE may use a compressed sensing recovery method, such as a CoSaMP algorithm, an RSP algorithm, or an AMP algorithm, etc., to estimate the acknowledgement response vector x transmitted by the base station from the received signal y according to the compressed sensing measurement matrix, thereby obtaining ACK information corresponding to the data transmitted by the UE.

This disclosure is described above by way of examples, and performance estimation of this disclosure shall be described below.

It is assumed that the number of UEs registered in the base station is N=500, and a probability that each UE is in an active state is Pa=0.05, then an average value of active UEs is K=25, and the number of resources used for contention is $N_r=64$.

If the UE meets no data collision, it is assumed that a probability that the base station is able to successfully demodulate data from the UE is $P_{d1}=0.95$; if two UEs select the same resources at the same time to transmit data, that is, data collision occurs, it is assumed that a probability that the base station is able to successfully demodulate data from either of the two UEs is $P_{d2}=0.4$; if three UEs select the same resources at the same time to transmit data, that is, data collision occurs, it is assumed that a probability that the base station is able to successfully demodulate data from any one of the three UEs is $P_{d3}=0.1$; and the number of measurement values is M=124.

In order to evaluate performance of the scheme of this disclosure which is based on compressed sensing ACK feedback (it may be called as CSAF), following four performance indices are defined:

signaling overhead of ACK feedback, that is, a size of signaling needed by the base station in feeding back the ACK information to all the UE;

a probability $P_{cd}$ of correct detection, that is, a probability that the base station successfully demodulates the data transmitted by the UE and the UE successfully demodulates the ACK information from the base station;

a probability $P_{mu}$ of missing of detection of data from the UE, that is, a probability that the base station does not successfully demodulate the data transmitted by the UE but the UE receives the ACK information from the base station; and a probability $P_{ma}$ of missing of detection of ACK, that is, a probability that the base station successfully demodulates the data transmitted by the UE but the UE does not successfully demodulate the ACK information from the base station.

Table 1 shows comparison of signaling overhead of these schemes.

TABLE 1

| Schemes | UIAF | REAF | IEEE 802.11 | CSAF |
|---|---|---|---|---|
| Signaling overhead | 500 | 64 | 225 | 124 |

As shown in Table 1, the signaling needed by the REAF scheme is minimum, and the signaling needed by the UIAF scheme is maximum.

Figure 5:
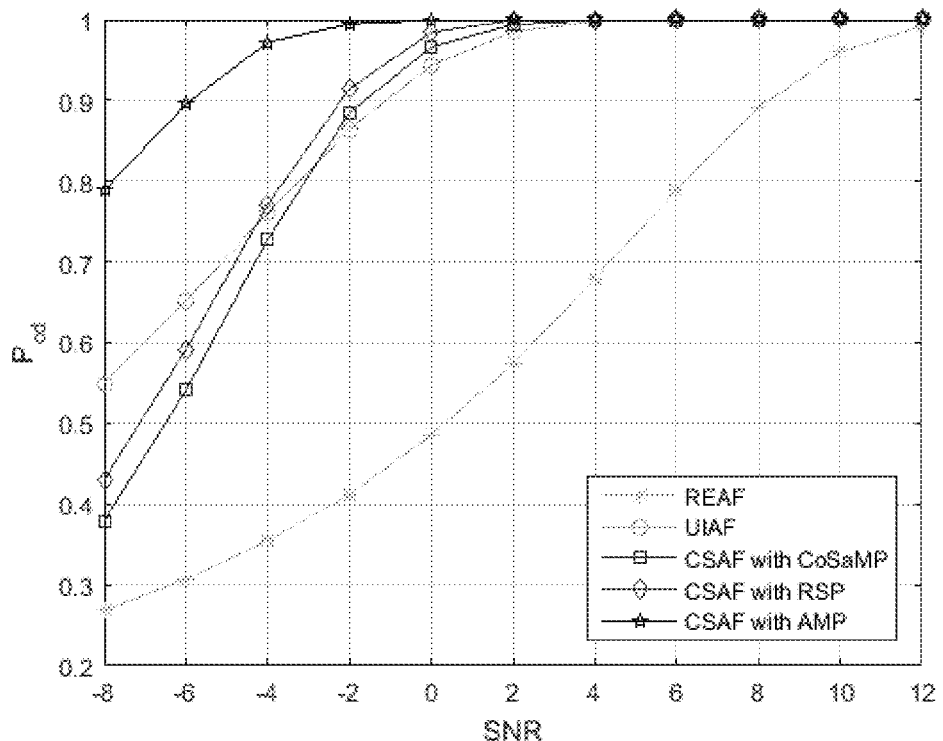
FIG. 5 is a schematic diagram of performance of Embodiment 3 of this disclosure.

FIG. 5 is a schematic diagram of performance of the embodiment of this disclosure, in which probabilities $P_{cd}$ of correct detection at different signal to noise ratios (SNRs) of the CSAF, UIAF and REAF schemes are compared. As shown in FIG. 5, the CSAF scheme proposed in this disclosure at the AMP algorithm has a highest probability $P_{cd}$ of correct detection, and the REAF scheme has a worst probability $P_{cd}$ of correct detection, this is because that in the contention-based uplink data transmission, there exists no one-to-one correspondence between transmission resources and UE. The performance of the UIAF scheme at a lower SNR is relatively better than those of the CSAF scheme at the CoSaMP algorithm and the RSP algorithm; however, when an SNR is relatively large, the CSAF scheme has a higher $P_{cd}$; and the CSAF scheme has a better $P_{cd}$ at the RSP algorithm than at the CoSaMP algorithm.

Figure 6:
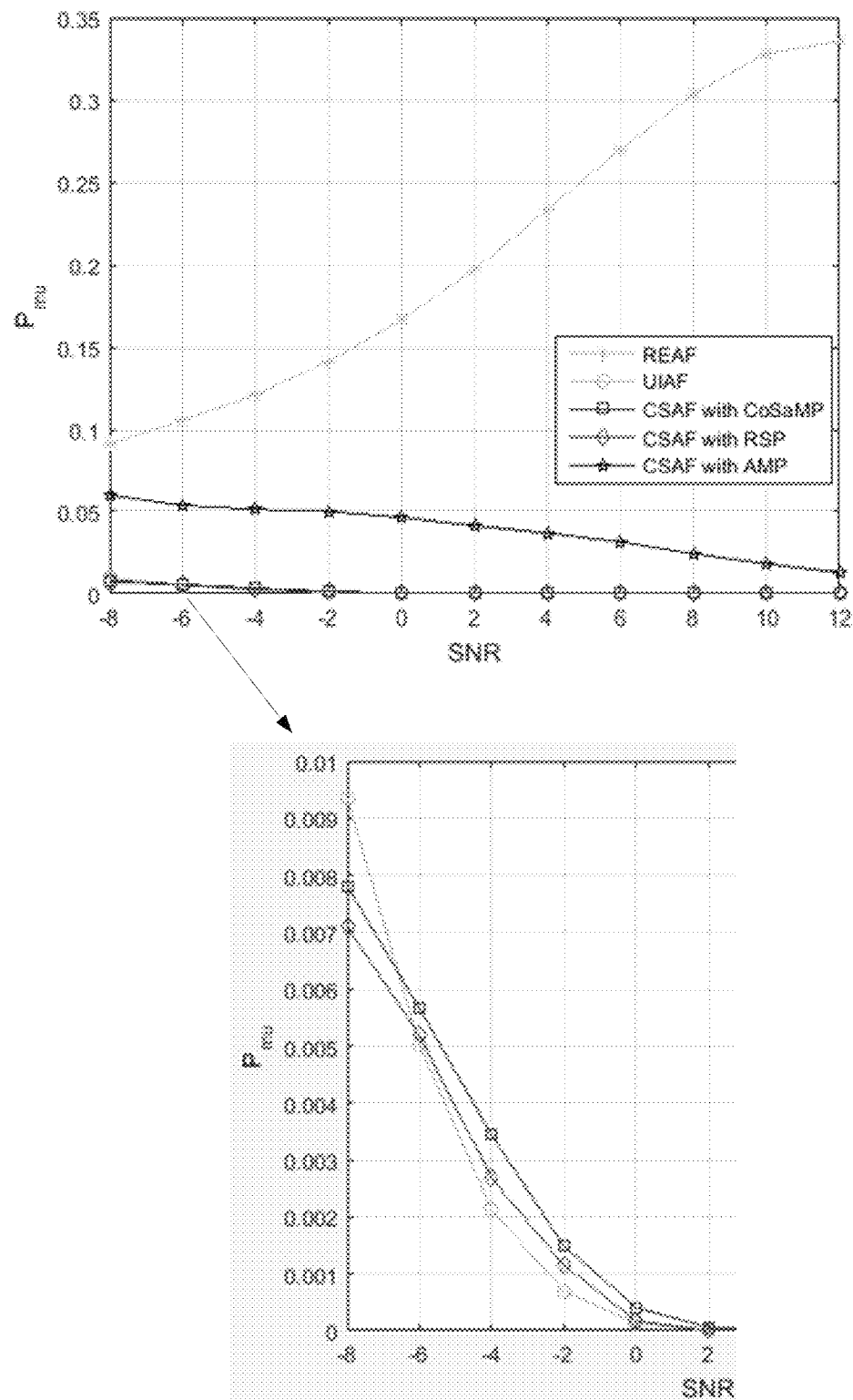
FIG. 6 is another schematic diagram of the performance of Embodiment 3 of this disclosure.

FIG. 6 is another schematic diagram of the performance of the embodiment of this disclosure, in which probabilities $P_{mu}$ of missing of detection of data from the UE at different SNRs of the CSAF, UIAF and REAF schemes are compared; wherein, the REAF scheme has a highest probability $P_{mu}$, while a difference between the probabilities $P_{mu}$ of missing of detection of data from the UE in the UIAF scheme and the CSAF scheme at the CoSaMP algorithm and the RSP algorithm is small; however, the performance of the CSAF scheme at the AMP algorithm is five times higher than that of the UIAF scheme.

Figure 7:
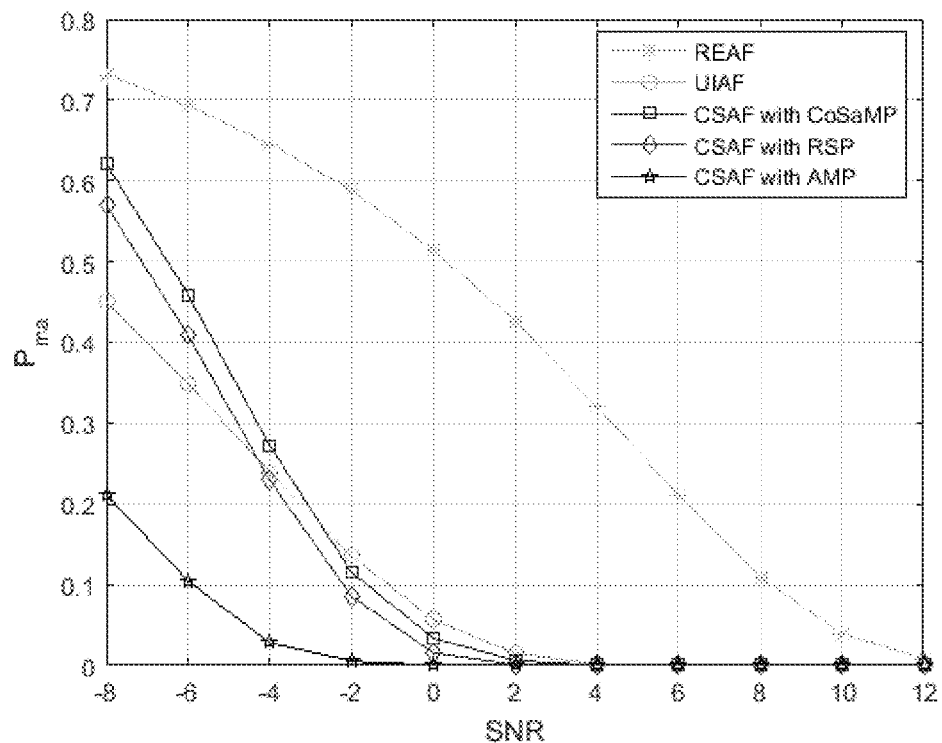
FIG. 7 is a further schematic diagram of the performance of Embodiment 3 of this disclosure.

FIG. 7 is a further schematic diagram of the performance of the embodiment of this disclosure, in which probabilities of missing of detection of ACK at different SNRs of the CSAF, UIAF and REAF schemes are compared; wherein, the CSAF scheme proposed in this disclosure at the AMP algorithm has a lowest probability $P_{ma}$ of missing of detection of ACK, and the REAF scheme has a highest probability $P_{ma}$ of missing of detection of ACK; and a difference between the probabilities $P_{ma}$ of missing of detection of ACK of the UIAF scheme and the CSAF scheme at the CoSaMP algorithm and the RSP algorithm is small.

In summary, the CSAF scheme proposed in this disclosure at the CoSaMP algorithm and the RSP algorithm obtains a detection performance similar to that of the UIAF scheme at 25% of signaling overhead of the UIAF scheme; the CSAF scheme at the AMP algorithm has a best probability of correct detection and a lowest probability of missing of detection of ACK; however, its probability of missing of detection of data from the UE is relatively large; and the REAF scheme has lower signaling overhead, but its performance is too poor.

Embodiment 4

The embodiment of the present disclosure provides an acknowledgement information feedback apparatus, with contents identical to those in Embodiment 1 being not going to be described herein any further.

Figure 8:
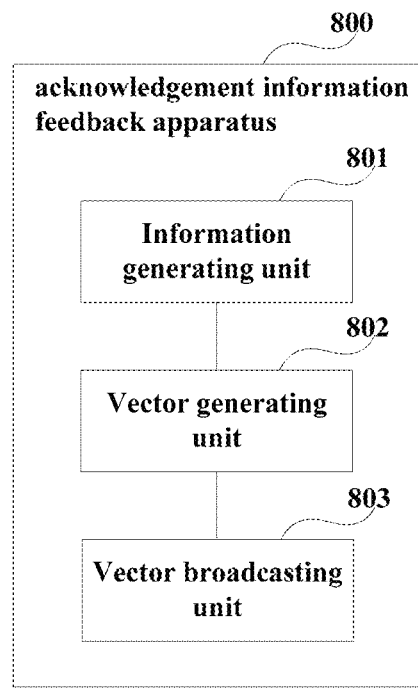
FIG. 8 is a schematic diagram of the acknowledgement information feedback apparatus of Embodiment 4 of this disclosure.

FIG. 8 is a schematic diagram of the acknowledgement information feedback apparatus of the embodiment of this disclosure. As shown in FIG. 8, the acknowledgement information feedback apparatus 800 includes:

an information generating unit 801 configured to generate an acknowledgement response vector according to whether data transmitted by a plurality of UEs based on contention are correctly demodulated;

a vector generating unit 802 configured to generate a measurement vector according to a predetermined compressed sensing measurement matrix and the generated acknowledgement response vector; and a vector broadcasting unit 803 configured to broadcast the measurement vector to the plurality of UEs.

In an embodiment, the acknowledgement response vector may be an N×1 vector, N being the number of the plurality of UEs, K being the number of UEs being in an activated state and transmitting data in the plurality of UEs, and N being greater than or equal to K.

$x_n$ is an element in the acknowledgement response vector, n being greater than or equal to 1 and less than or equal to N;

$x_n$ being 1 showing that data transmitted by an n-th UE are correctly demodulated, and $x_n$ being 0 showing that data transmitted by the n-th UE are not correctly demodulated, or the n-th UE does not transmit data;

alternatively, $x_n$ being 0 showing that data transmitted by the n-th UE are correctly demodulated, and $x_n$ being 1 showing that data transmitted by the n-th UE are not correctly demodulated, or the n-th UE does not transmit data.

It should be noted that contents of the acknowledgement response vector are only schematically described above. However, this disclosure is not limited thereto, and a particular implementation of the acknowledgement response vector may be determined according to an actual situation.

In an embodiment, the compressed sensing measurement matrix may be an M×$N_{ZC}$ matrix, and the measurement vector is a M×1 vector; where, M≥cK log(N/K), c is a constant, and $N_{ZC}$ is a prime number greater than or equal to N.

Figure 9:
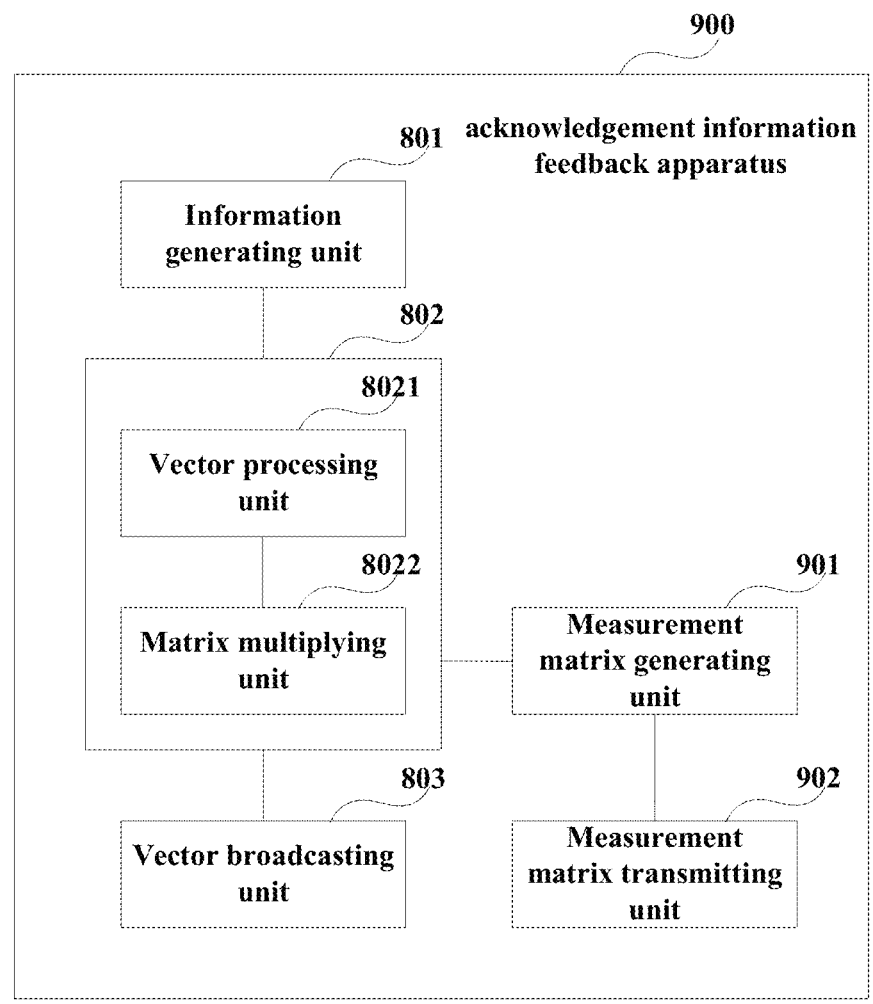
FIG. 9 is another schematic diagram of the acknowledgement information feedback apparatus of Embodiment 4 of this disclosure.

FIG. 9 is another schematic diagram of the acknowledgement information feedback apparatus of the embodiment of this disclosure. As shown in FIG. 9, the acknowledgement information feedback apparatus 900 includes an information generating unit 801, a vector generating unit 802 and a vector broadcasting unit 803, as described above.

As shown in FIG. 9, the acknowledgement information feedback apparatus 900 may further include:

a measurement matrix generating unit 901 configured to generate the compressed sensing measurement matrix according to a partial circulant orthogonal matrix.

As shown in FIG. 9, the acknowledgement information feedback apparatus 900 may further include:

a measurement matrix transmitting unit 902 configured to transmit the compressed sensing measurement matrix to the UE.

As shown in FIG. 9, the vector generating unit 802 may include:

a vector processing unit 8021 configured to add zero to the N×1 acknowledgement response vector, to generate an $N_{ZC}$×1 vector; and a matrix multiplying unit 8022 configured to multiply the M×$N_{ZC}$ compressed sensing measurement matrix by the $N_{ZC}$×1 vector, to generate the M×1 measurement vector.

Figure 10:
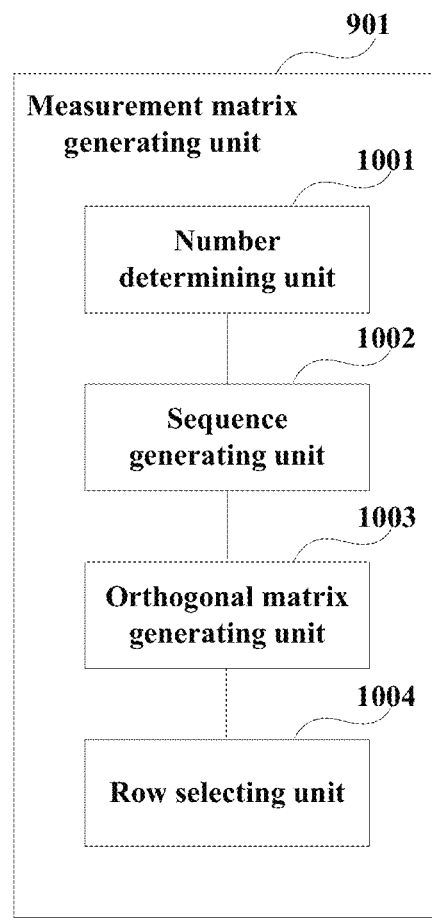
FIG. 10 is a schematic diagram of the measurement matrix generating unit of Embodiment 4 of this disclosure.

FIG. 10 is a schematic diagram of the measurement matrix generating unit of the embodiment of this disclosure. As shown in FIG. 10, the measurement matrix generating unit 901 may include:

a number determining unit 1001 configured to select a prime number $N_{ZC}$ greater than N according to the number N of the plurality of UEs;

a sequence generating unit 1002 configured to generate a ZC sequence with a length of $N_{ZC}$;

an orthogonal matrix generating unit 1003 configured to generate a circulant orthogonal matrix according to the ZC sequence; each row in the circulant orthogonal matrix is formed by performing cyclic shift on the ZC sequence; and a row selecting unit 1004 configured to randomly select M rows from the circulant orthogonal matrix, to generate the $M \times N_{ZC}$ compressed sensing measurement matrix.

The embodiment of this disclosure further provides a base station, configured with the above-described acknowledgement information feedback apparatus 800 or 900.

Figure 11:
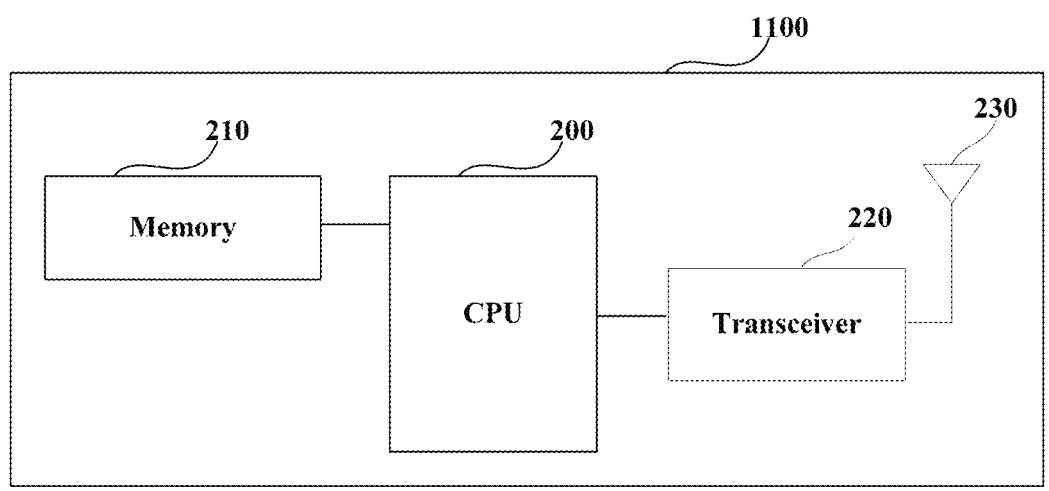
FIG. 11 is a schematic diagram of the base station of Embodiment 4 of this disclosure.

FIG. 11 is a schematic diagram of the base station of the embodiment of this disclosure. As shown in FIG. 11, a base station 1100 may include a central processing unit (CPU) 200 and a memory 210, the memory 210 being coupled to the central processing unit 200. The memory 210 may store various data, and furthermore, it may store a program for information processing, and execute the program under control of the central processing unit 200.

The acknowledgement information feedback apparatus 800 or 900 may carry out the acknowledgement information feedback method described in Embodiment 1. And the central processing unit 200 may be configured to carry out the functions of the acknowledgement information feedback apparatus 800 or 900.

For example, the central processing unit 200 may be configured to perform the following control: generating an acknowledgement response vector according to whether data transmitted by a plurality of UEs based on contention are correctly demodulated; generating a measurement vector according to a predetermined compressed sensing measurement matrix and the generated acknowledgement response vector; and broadcasting the measurement vector to the plurality of UEs.

Furthermore, as shown in FIG. 11, the base station 1100 may include a transceiver 220, and an antenna 230, etc. Functions of the above components are similar to those in the relevant art, and shall not be described herein any further. It should be noted that the base station 1100 does not necessarily include all the parts shown in FIG. 11, and furthermore, the base station 1100 may include parts not shown in FIG. 11, and the relevant art may be referred to.

It can be seen from the above embodiment that the measurement vector is generated according to the compressed sensing measurement matrix and the generated acknowledgement response vector and is broadcasted. Hence, this disclosure is not only applicable to contention-based data transmission scenarios, but also has relatively low signaling overhead and reliable performance.

Embodiment 5

The embodiment of the present disclosure provides an acknowledgement information feedback apparatus, with contents identical to those in Embodiment 2 being not going to be described herein any further.

Figure 12:
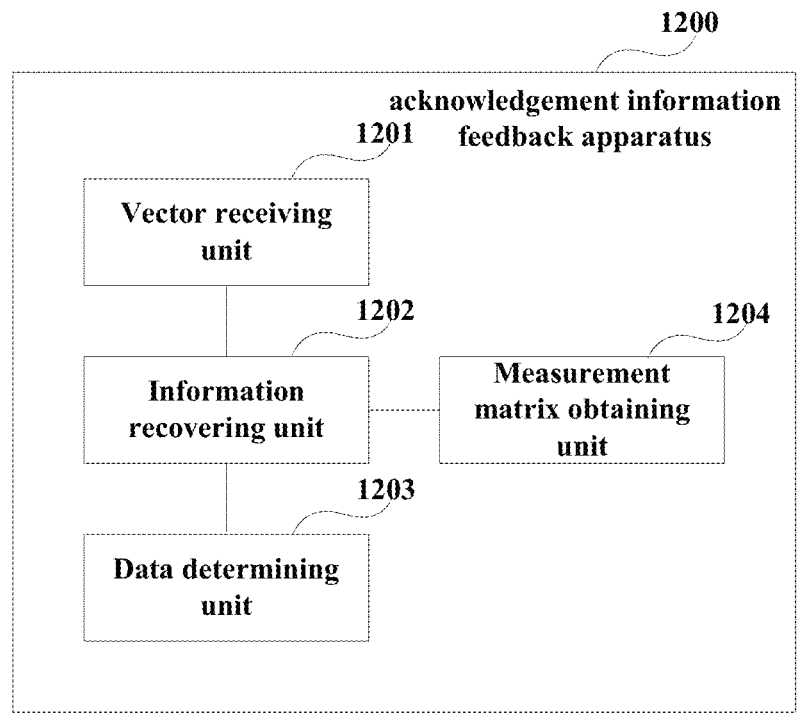
FIG. 12 is a schematic diagram of the acknowledgement information feedback apparatus of Embodiment 5 of this disclosure.

FIG. 12 is a schematic diagram of the acknowledgement information feedback apparatus of the embodiment of this disclosure. As shown in FIG. 12, the acknowledgement information feedback apparatus 1200 includes:

a vector receiving unit 1201 configured to receive a measurement vector used for feeding back acknowledgement information, after transmitting data based on contention;

an information recovering unit 1202 configured to recover an acknowledgement response vector according to a predetermined compressed sensing measurement matrix and the measurement vector; and a data determining unit 1203 configured to determine whether the transmitted data are correctly demodulated according to the recovered acknowledgement response vector.

In an embodiment, the acknowledgement response vector may be an N×1 vector, N being the number of a plurality of UEs, K being the number of UEs being in an activated state and transmitting data in the plurality of UEs, and N being greater than or equal to K.

$x_n$ is an element in the acknowledgement response vector, n being greater than or equal to 1 and less than or equal to N;

$x_n$ being 1 showing that data transmitted by an n-th UE are correctly demodulated, and $x_n$ being 0 showing that data transmitted by the n-th UE are not correctly demodulated, or the n-th UE does not transmit data;

alternatively, $x_n$ being 0 showing that data transmitted by the n-th UE are correctly demodulated, and $x_n$ being 1 showing that data transmitted by the n-th UE are not correctly demodulated, or the n-th UE does not transmit data.

It should be noted that contents of the acknowledgement response vector are only schematically described above. However, this disclosure is not limited thereto, and a particular implementation of the acknowledgement response vector may be determined according to an actual situation.

In an embodiment, the compressed sensing measurement matrix may be an $M \times N_{ZC}$ matrix, and the measurement vector may be an M×1 vector; where, $M \geq cK \log(N/K)$, c is a constant, and $N_{ZC}$ is a prime number greater than or equal to N.

In an embodiment, as shown in FIG. 12, the acknowledgement information feedback apparatus 1200 may further include:

a measurement matrix obtaining unit 1204 configured to generate the compressed sensing measurement matrix according to a partial circulant orthogonal matrix, or receive the compressed sensing measurement matrix transmitted by a base station.

This embodiment further provides a UE, configured with the above-described acknowledgement information feedback apparatus 1200.

Figure 13:
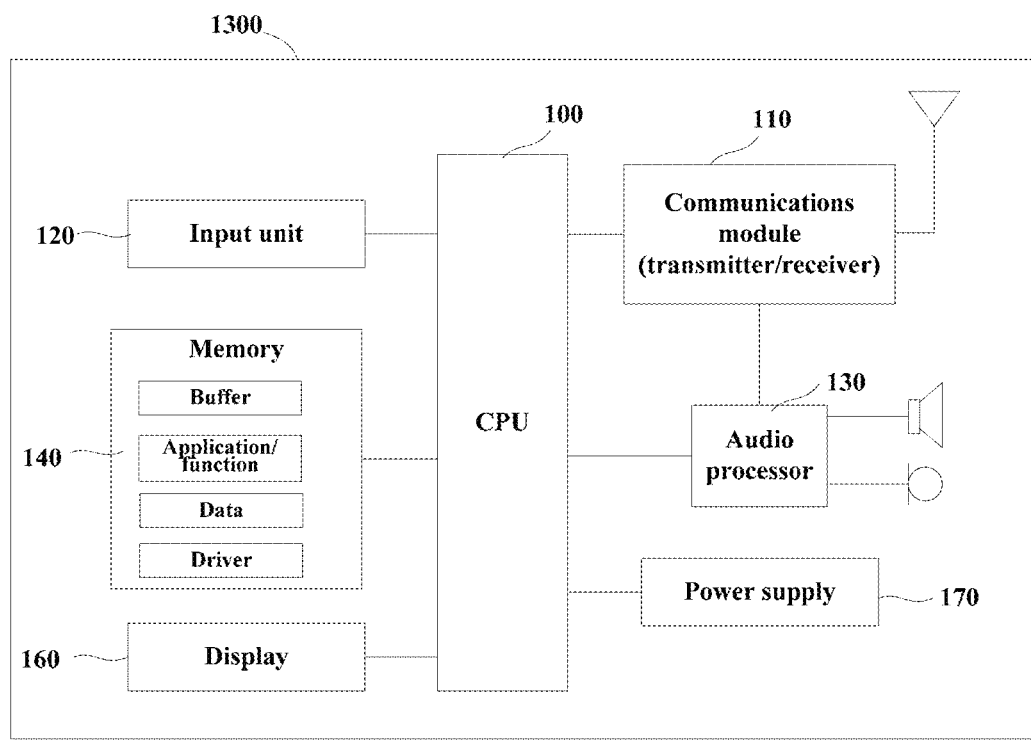
FIG. 13 is a schematic diagram of the UE of Embodiment 5 of this disclosure.

FIG. 13 is a schematic diagram of the UE of the embodiment of this disclosure. As shown in FIG. 13, a UE 1300 may include a central processing unit 100 and a memory 140, the memory 140 being coupled to the central processing unit 100. It should be noted that this figure is illustrative only, and other types of structures may also be used, so as to supplement or replace this structure and achieve a telecommunications function or other functions.

In one implementation, the functions of the acknowledgement information feedback apparatus 1200 may be integrated into the central processing unit 100. The central processing unit 100 may be configured to carry out the acknowledgement information feedback method described in Embodiment 2.

For example, the central processing unit 100 may be configured to perform the following control: receiving a measurement vector used for feeding back acknowledgement information after transmitting data based on contention; recovering an acknowledgement response vector according to a predetermined compressed sensing measurement matrix and the measurement vector; and determining whether the transmitted data are correctly demodulated according to the recovered acknowledgement response vector.

In another implementation, the acknowledgement information feedback apparatus 1200 and the central processing unit 100 may be configured separately. For example, the acknowledgement information feedback apparatus 1200 may be configured as a chip connected to the central processing unit 100, with its functions being realized under control of the central processing unit 100.

As shown in FIG. 13, the UE 1300 may further include a communication module 110, an input unit 120, an audio processor 130, a display 160 and a power supply 170. Functions of the above components are similar to those in the relevant art, and shall not be described herein any further. It should be noted that the UE 1300 does not necessarily include all the parts shown in FIG. 13, and furthermore, the UE 1300 may include parts not shown in FIG. 13, and the relevant art may be referred to.

It can be seen from the above embodiment that the measurement vector is generated according to the compressed sensing measurement matrix and the generated acknowledgement response vector and is broadcasted. Hence, this disclosure is not only applicable to contention-based data transmission scenarios, but also has relatively low signaling overhead and reliable performance.

Embodiment 6

The embodiment of the present disclosure provides a communication system, with contents identical to those in embodiments 1-5 being not going to be described herein any further.

Figure 14:
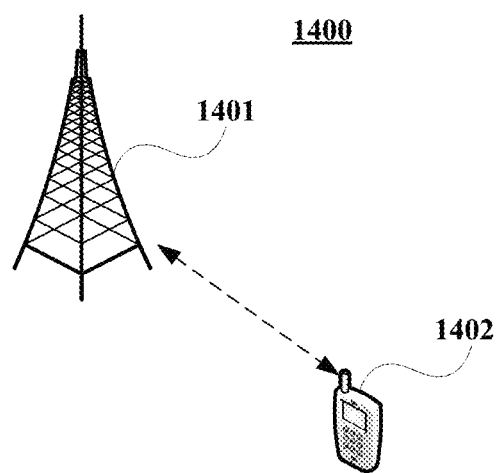
FIG. 14 is a schematic diagram of the communication system of Embodiment 6 of this disclosure.

FIG. 14 is a schematic diagram of the communication system of the embodiment of this disclosure. As shown in FIG. 14, a communication system 1400 may include a base station 1401 and a UE 1402.

The UE 1402 is configured to transmit data to the base station 1401 based on contention, and receive a measurement vector used for feeding back acknowledgement information; recover an acknowledgement response vector according to a predetermined compressed sensing measurement matrix and the measurement vector; and determine whether the transmitted data are correctly demodulated according to the recovered acknowledgement response vector.

The base station 1401 is configured to generate an acknowledgement response vector according to whether data transmitted by a plurality of UEs 1402 based on contention are correctly demodulated; generate a measurement vector according to a predetermined compressed sensing measurement matrix and the generated acknowledgement response vector; and broadcast the measurement vector to the plurality of UEs 1402.

In this embodiment, the base station 1401 may serve for N UEs 1402, K UEs 1402 therein being in an activated state and transmitting data.

An embodiment of the present disclosure provides a computer readable program, which, when executed in a base station, will cause the base station to carry out the acknowledgement information feedback method described in Embodiment 1.

An embodiment of the present disclosure provides a computer storage medium, including a computer readable program, which will cause a base station to carry out the acknowledgement information feedback method described in Embodiment 1.

An embodiment of the present disclosure provides a computer readable program, which, when executed in a UE, will cause the UE to carry out the acknowledgement information feedback method described in Embodiment 2.

An embodiment of the present disclosure provides a computer storage medium, including a computer readable program, which will cause a UE to carry out the acknowledgement information feedback method described in Embodiment 2.

The above apparatuses of the present disclosure may be implemented by hardware, or by hardware in combination with software. The present disclosure relates to such a computer-readable program that when the program is executed by a logic device, the logic device is enabled to carry out the apparatus or components as described above, or to carry out the methods or steps as described above. The present disclosure also relates to a storage medium for storing the above program, such as a hard disk, a floppy disk, a CD, a DVD, and a flash memory, etc.

The method for random access and data transmission carried out in the apparatus for random access and data transmission described with reference to the embodiments of this disclosure may be directly embodied as hardware, software modules executed by a processor, or a combination thereof. For example, one or more functional block diagrams and/or one or more combinations of the functional block diagrams shown in FIG. 8 (such as the vector generating unit, etc.) may either correspond to software modules of procedures of a computer program, or correspond to hardware modules. Such software modules may respectively correspond to the steps shown in FIG. 1. And the hardware module, for example, may be carried out by firming the soft modules by using a field programmable gate array (FPGA).

The soft modules may be located in an RAM, a flash memory, an ROM, an EPROM, and EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in figures may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in the accompanying drawings may also be realized as a combination of computing equipment, such as a combination of a DSP and a microprocessor, a plurality of processors, one or more microprocessors in communication combination with a DSP, or any other such configuration.

This disclosure is described above with reference to particular embodiments. However, it should be understood by those skilled in the art that such a description is illustrative only, and not intended to limit the protection scope of the present disclosure. Various variants and modifications may be made by those skilled in the art according to the principle of the present disclosure, and such variants and modifications fall within the scope of the present disclosure.

What is claimed is:

1. An acknowledgement information feedback apparatus, comprising:
   an information generating unit configured to generate an acknowledgement response vector according to whether data transmitted by a plurality of user equipments (UEs) based on contention are correctly demodulated;
   a vector generating unit configured to generate a measurement vector according to a predetermined compressed sensing measurement matrix and the generated acknowledgement response vector; and
   a vector broadcasting unit configured to broadcast the measurement vector to the plurality of UEs.

2. The feedback apparatus according to claim 1, wherein the acknowledgement response vector is an N×1 vector, N being the number of the plurality of UEs, K being the number of UEs being in an activated state and transmitting data in the plurality of UEs, and N being greater than or equal to K.

3. The feedback apparatus according to claim 2, wherein $x_n$ is an element in the acknowledgement response vector, n being greater than or equal to 1 and less than or equal to N;
   $x_n$ being 1 showing that data transmitted by an n-th UE are correctly demodulated, and $x_n$ being 0 showing that data transmitted by the n-th UE are not correctly demodulated, or the n-th UE does not transmit data;
   or, $x_n$ being 0 showing that data transmitted by the n-th UE are correctly demodulated, and $x_n$ being 1 showing that data transmitted by the n-th UE are not correctly demodulated, or the n-th UE does not transmit data.

4. The feedback apparatus according to claim 2, wherein the compressed sensing measurement matrix is an $M \times N_{ZC}$ matrix, and the measurement vector is a M×1 vector;
   where, M≥cK log(N/K), c is a constant, and $N_{ZC}$ is a prime number greater than or equal to N.

5. The feedback apparatus according to claim 1, wherein the feedback apparatus further comprises:
   a measurement matrix generating unit configured to generate the compressed sensing measurement matrix according to a partial circulant orthogonal matrix.

6. The feedback apparatus according to claim 5, wherein the measurement matrix generating unit comprises:
   a number determining unit configured to select a prime number $N_{ZC}$ greater than N according to the number N of the plurality of UEs;
   a sequence generating unit configured to generate a ZC sequence with a length of $N_{ZC}$;
   an orthogonal matrix generating unit configured to generate a circulant orthogonal matrix according to the ZC sequence; wherein each row in the circulant orthogonal matrix is formed by performing cyclic shift on the ZC sequence; and
   a row selecting unit configured to randomly select M rows from the circulant orthogonal matrix, to generate the $M \times N_{ZC}$ compressed sensing measurement matrix.

7. The feedback apparatus according to claim 5, wherein the feedback apparatus further comprises:
   a measurement matrix transmitting unit configured to transmit the compressed sensing measurement matrix to the UE.

8. The feedback apparatus according to claim 4, wherein the vector generating unit comprises:
   a vector processing unit configured to add zero to the N×1 acknowledgement response vector, to generate an $N_{ZC} \times 1$ vector; and
   a matrix multiplying unit configured to multiply the $M \times N_{ZC}$ compressed sensing measurement matrix by the $N_{ZC} \times 1$ vector, to generate the M×1 measurement vector.

9. An acknowledgement information feedback apparatus, comprising:
   a vector receiving unit configured to receive a measurement vector used for feeding back acknowledgement information, after transmitting data based on contention;
   an information recovering unit configured to recover an acknowledgement response vector according to a predetermined compressed sensing measurement matrix and the measurement vector; and
   a data determining unit configured to determine whether the transmitted data are correctly demodulated according to the recovered acknowledgement response vector.

10. The feedback apparatus according to claim 9, wherein the acknowledgement response vector is an N×1 vector, N being the number of a plurality of UEs, K being the number of UEs being in an activated state and transmitting data in the plurality of UEs, and N being greater than or equal to K.

11. The feedback apparatus according to claim 10, wherein $x_n$ is an element in the acknowledgement response vector, n being greater than or equal to 1 and less than or equal to N;
    $x_n$ being 1 showing that data transmitted by an n-th UE are correctly demodulated, and $x_n$ being 0 showing that data transmitted by the n-th UE are not correctly demodulated, or the n-th UE does not transmit data;
    or, $x_n$ being 0 showing that data transmitted by the n-th UE are correctly demodulated, and $x_n$ being 1 showing that data transmitted by the n-th UE are not correctly demodulated, or the n-th UE does not transmit data.

12. The feedback apparatus according to claim 10, wherein the compressed sensing measurement matrix is an $M \times N_{ZC}$ matrix, and the measurement vector is an M×1 vector;
    where, M≥cK log(N/K), c is a constant, and $N_{ZC}$ is a prime number greater than or equal to N.

13. The feedback apparatus according to claim 9, wherein the feedback apparatus further comprises:
    a measurement matrix obtaining unit configured to generate the compressed sensing measurement matrix according to a partial circulant orthogonal matrix, or receive the compressed sensing measurement matrix transmitted by a base station.

14. A communication system, comprising:
    a UE configured to transmit data to a base station based on contention, and receive a measurement vector used for feeding back acknowledgement information; recover an acknowledgement response vector according to a predetermined compressed sensing measurement matrix and the measurement vector; and determine whether the transmitted data are correctly demodulated according to the recovered acknowledgement response vector; and the base station configured to generate an acknowledgement response vector according to whether data transmitted by a plurality of UEs based on contention are correctly demodulated; generate a measurement vector according to a predetermined compressed sensing measurement matrix and the generated acknowledgement response vector; and broadcast the measurement vector to the plurality of UEs.

15. The communication system according to claim 14, wherein the base station serves for N UEs, K UEs therein being in an activated state and transmitting data.

* * * * *